United States Patent [19]
Yokota et al.

[11] Patent Number: 5,452,279
[45] Date of Patent: Sep. 19, 1995

[54] INFORMATION RECORDING/REPRODUCING APPARATUS FOR RECORDING AND REPRODUCING INFORMATION IN ACCORDANCE WITH MARK INTERVAL RECORDING SCHEME OR MARK LENGTH RECORDING SCHEME

[75] Inventors: Tsuneshi Yokota, Kawasaki; Katsumi Suzuki, Tokyo; Tomohisa Yoshimaru, Yokohama, all of Japan

[73] Assignee: Kabushiki Kaisha Toshiba, Kawasaki, Japan

[21] Appl. No.: 34,424

[22] Filed: Mar. 19, 1993

[30] Foreign Application Priority Data

Mar. 23, 1992 [JP] Japan .................. 4-064977

[51] Int. Cl.⁶ ............................................... G11B 7/00
[52] U.S. Cl. ........................................ 369/48; 369/54; 369/58; 369/124
[58] Field of Search ................ 369/48, 53, 54, 58, 369/77.2, 111, 124, 275.5; 360/25, 60, 133

[56] References Cited

U.S. PATENT DOCUMENTS

| | | | |
|---|---|---|---|
| 4,698,695 | 10/1987 | Kosaka et al. | 369/58 X |
| 4,853,915 | 8/1989 | Takasago et al. | 369/58 X |
| 4,962,494 | 10/1990 | Kimura | 369/58 X |
| 5,042,020 | 8/1991 | Endo | 369/58 X |
| 5,142,626 | 8/1992 | Arnold et al. | 369/58 X |
| 5,241,524 | 8/1993 | Lee | 369/58 X |
| 5,257,253 | 10/1993 | Otsubo et al. | 369/48 |
| 5,272,693 | 12/1993 | Fujisawa | 360/133 X |
| 5,289,451 | 2/1994 | Ashinuma et al. | 369/58 |

FOREIGN PATENT DOCUMENTS 3144919 6/1991 Japan .

Primary Examiner—W. R. Young
Attorney, Agent, or Firm—Cushman, Darby & Cushman

[57] ABSTRACT

The recording scheme of an optical disk is initially determined by a cartridge identifier housing the optical disk. The optical disk is then rotated at a rotational speed corresponding to the initially determined recording scheme, and a signal processing circuit is switched. Management data recorded on the optical disk is read to also determine the recording scheme, thereby improving the reliability of the determination. When no management data can be read, a recording scheme and associated rotational speed are changed. The management data representing the recording scheme is then read according to the changed recording scheme. A medium type determined based on the management data has priority over that of the medium type obtained by the identifier of the cartridge.

27 Claims, 12 Drawing Sheets

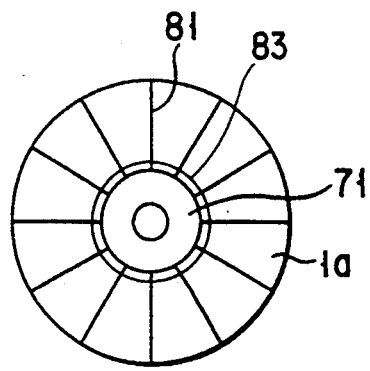
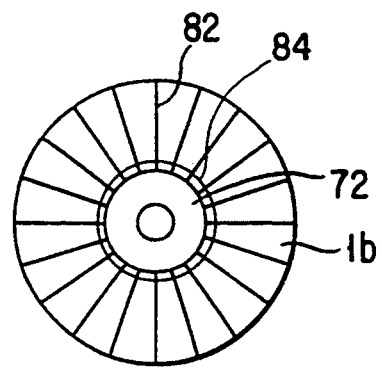
FIG. 2A  FIG. 2B
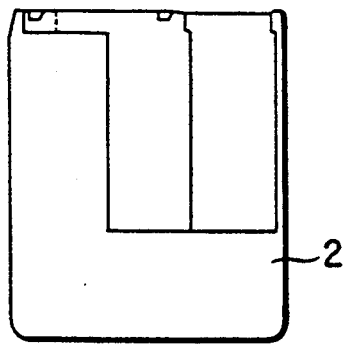
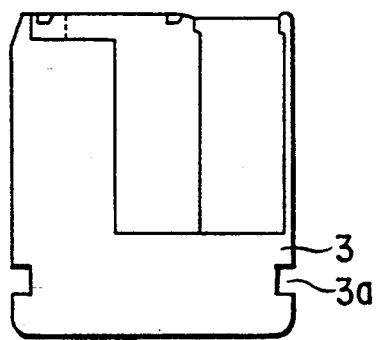
FIG. 3A  FIG. 3B

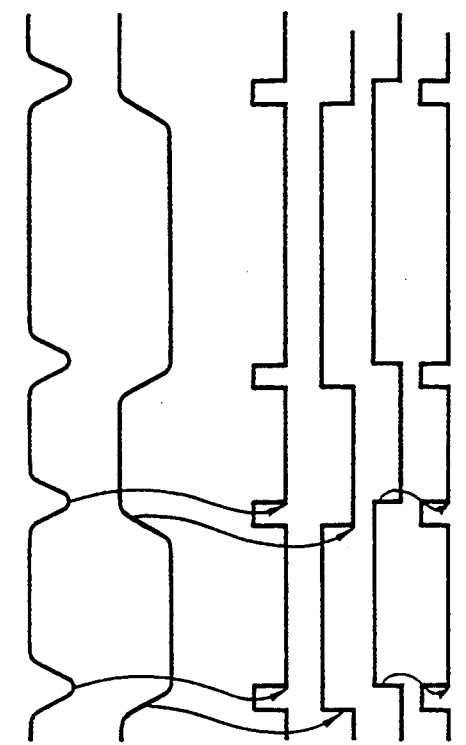

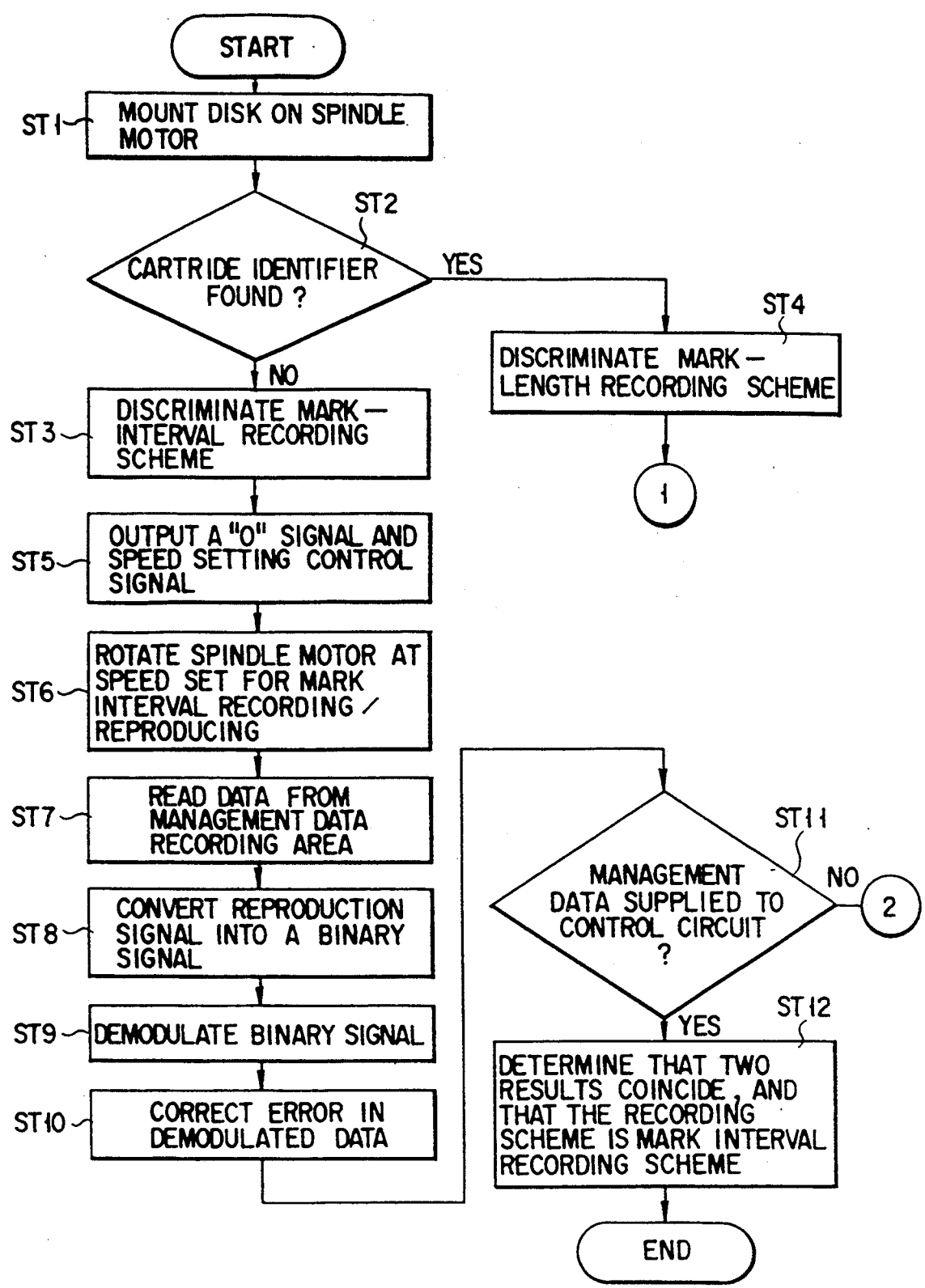
F I G. 5A

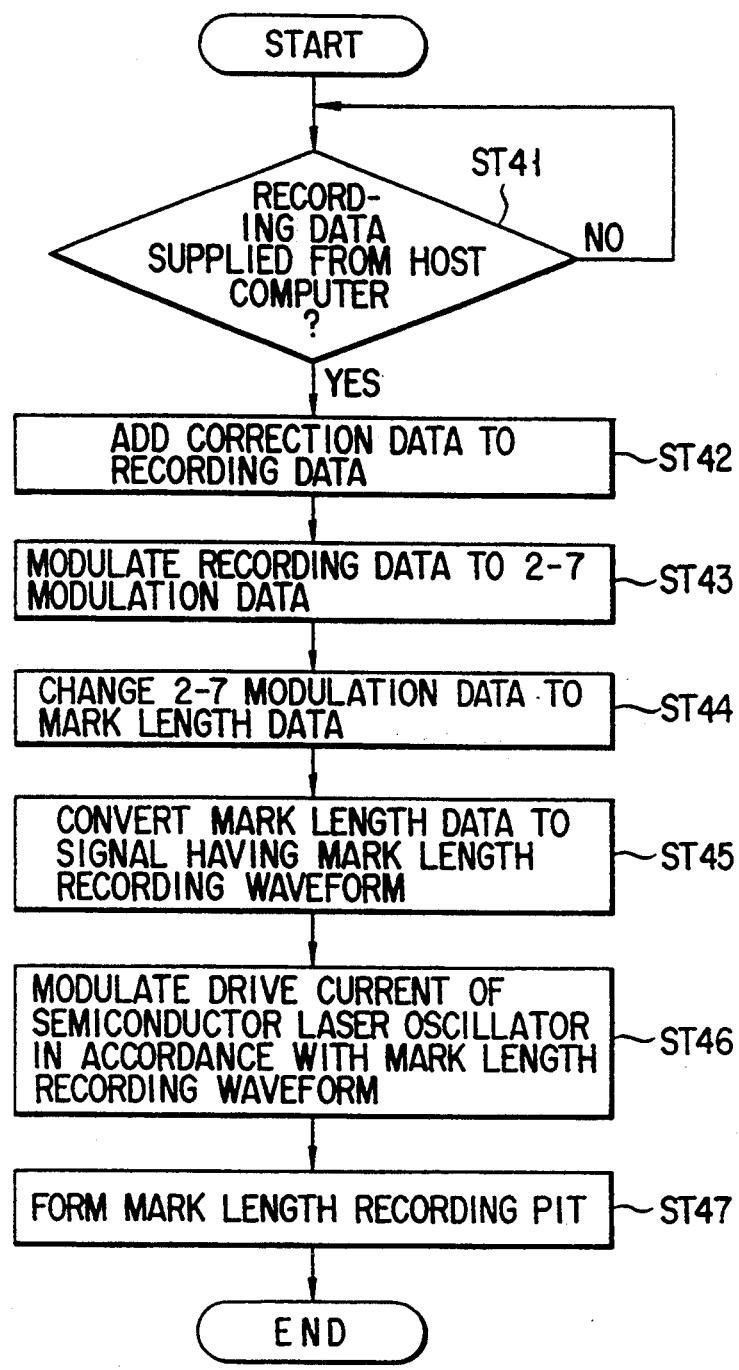
F I G. 6A

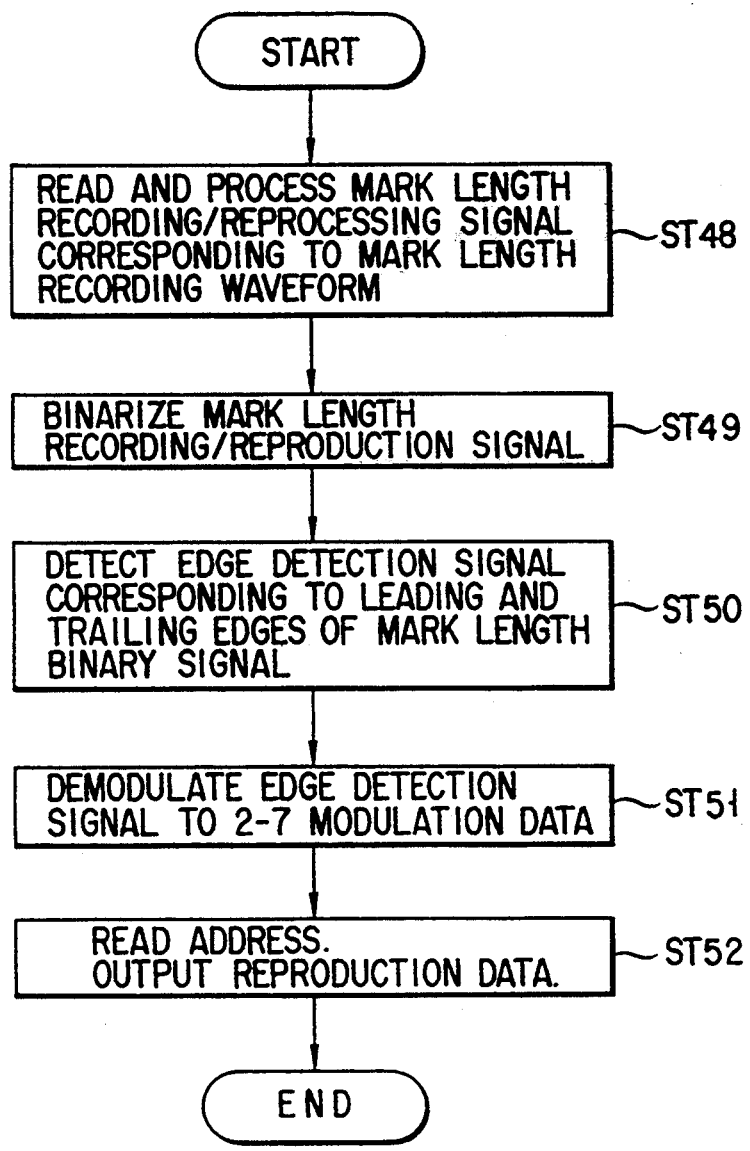
F I G. 6B

INFORMATION RECORDING/REPRODUCING APPARATUS FOR RECORDING AND REPRODUCING INFORMATION IN ACCORDANCE WITH MARK INTERVAL RECORDING SCHEME OR MARK LENGTH RECORDING SCHEME

BACKGROUND OF THE INVENTION

1. Field of the Invention

The present invention relates to an information recording/reproducing apparatus for recording information on, e.g., an optical disk in accordance with a mark interval recording scheme or a mark length recording scheme, and reproducing information recorded in accordance with the mark interval or mark length recording scheme.

2. Description of the Related Art

An optical disk apparatus as a conventional optical information recording/reproducing apparatus performs mark interval (pit position) recording as a scheme of recording digital data (recording data) on a recording medium, e.g., an optical disk.

That is, in the mark interval recording scheme, information is recorded by means of the lengths of the pit-to-pit intervals.

Conventionally, mark interval (pit position) recording is performed as a scheme of recording information on a recording medium. Along with a development in a recording medium suitable for higher-density recording and in the scheme of recording information on the recording medium, mark length recording is becoming possible as a recording scheme.

That is, in the mark length recording scheme, pits having different lengths are formed, and information is recorded by means of the pit lengths and the lengths of the spaces between pits.

Theoretically, the mark length recording scheme has a recording density twice that of the conventional mark interval (pit position) recording scheme. However, due to the different recording schemes, an information recording/reproducing apparatus employing the mark length recording scheme cannot read information recorded on a recording medium in accordance with the conventional mark interval (pit position) recording scheme. Thus, compatibility cannot be obtained.

Hence, an information recording/reproducing apparatus that can record and reproduce information on and from both a recording medium of the conventional mark interval (pit position) recording scheme and a recording medium of the mark length recording scheme that enables a higher-density recording is developed.

In this information recording/reproducing apparatus, an apparatus that can reliably discriminate whether the recording scheme is the mark interval or mark length recording scheme has been demanded.

That is, when processing is performed with a wrong recording scheme, information recorded on the optical disk is sometimes damaged.

SUMMARY OF THE INVENTION

It is an object of the present invention to provide an information recording/reproducing apparatus for recording/reproducing information in accordance with two different recording schemes, i.e., the mark interval recording scheme and the mark length recording scheme, wherein whether the recording scheme is the mark interval or mark length recording scheme can be reliably discriminated.

According to the present invention, there is provided an apparatus for reproducing information from a first type recording medium in which pits having different lengths are formed, the information defined by the lengths of the pits and the spaces between the pits, and for reproducing information from a second type recording medium in which pits are formed, the information defined by pit-to-pit intervals, the first and second type recording medium housed in cartridges each having a first identifying portion identifying the type of the recording medium, and the first and second type recording media each having a second identifying portion representing the type thereof, the apparatus comprising: means for supporting the first and second type recording media; first discriminating means for discriminating the type of the recording medium supported by the support means, from the first identifying portion of the cartridge housing the medium supported by the support means; second discriminating means for discriminating the type of the recording medium supported by the support means, from the second identifying portion of the recording medium supported by the support means; and means for determining the type of the recording medium supported by the support means, when the types discriminated by the first and second discriminating means are identical.

According to the present invention, there is provided an apparatus for reproducing information from a first type recording medium in which pits having different lengths are formed, the information defined by the lengths of the pits and the spaces between the pits, and for reproducing information from a second type recording medium in which pits are formed, the information defined by pit-to-pit intervals, the apparatus comprising: means for supporting the first and second type recording media; first reproducing means for reproducing information from the recording medium supported by the support means by means of a first method designed for reproducing information from the first type recording medium; first discriminating means for discriminating that the recording medium supported by the support means is the first type recording medium when the first reproducing means is able to reproduce information from the recording medium supported by the support means; second reproducing means for reproducing information from the recording medium supported by the support means by means of a second method designed for reproducing information from the second type recording medium; and second discriminating means for discriminating that the recording medium supported by the support means is the second type recording medium when the second reproducing means is able to reproduce information from the recording medium supported by the support means.

According to the present invention, there is provided an apparatus for reproducing information from a first type recording medium in which pits having different lengths are formed, the information defined by the lengths of the pits and the spaces between the pits, and for reproducing information from a second type recording medium in which pits are formed, the information defined by pit-to-pit intervals, the first and second recording media housed in cartridges each having a identifying portion identifying the type of the recording medium, and the first and second type recording media each having recorded data representing the type thereof, the apparatus comprising: means for supporting the first and second type recording media; discriminating means for discriminating the type of the recording medium supported by the support means, from the identifying portion of the cartridge housing the medium supported by the support means; first reproducing means for reproducing the recorded data from the recording medium supported by the support means by means of a first method designed for reproducing the data recorded on the first type recording medium when the discriminating means discriminates that the recording medium supported by the support means is the first type recording medium; first determining means for determining that the recording medium supported by the support means is the first type recording medium when the first reproducing means is able to reproduce the data recorded on the recording medium supported by the support means; second reproducing means for reproducing the recorded data from the recording medium supported by the support means by means of a second method designed for reproducing the data recorded on the second type recording medium when the discriminating means discriminates that the recording medium supported by the support means is the second type recording medium; and second determining means for determining that the recording medium supported by the support means is the second type recording medium when the second reproducing means is able to reproduce the data recorded on the recording medium supported by the support means.

According to the present invention, there is provided an apparatus for reproducing information from a first type recording medium in which pits having different lengths are formed, the information defined by the lengths of the pits and the spaces between the pits, and for reproducing information from a second type recording medium in which pits are formed, the information defined by pit-to-pit intervals, the apparatus comprising: means for supporting the first and second type recording media; first reproducing means for reproducing information recorded on a header portion of the recording medium supported by the support means by means of a first method designed for reproducing information from the first type recording medium; first determining means for determining that the recording medium supported by the support means is the first type recording medium when the first reproducing means is able to reproduce information from the recording medium supported by the support means; second reproducing means for reproducing information recorded on a header portion of the recording medium supported by the support means by means of a second method designed for reproducing information from the second type recording medium; and second determining means for determining that the recording medium supported by the support means is the second type recording medium when the second reproducing means is able to reproduce information from the recording medium supported by the support means.

According to the present invention, there is provided an apparatus for reproducing information from a first type recording medium in which pits having different lengths are formed, the information defined by the lengths of the pits and the spaces between the pits, and for reproducing information from a second type recording medium in which pits are formed, the information defined by pit-to-pit intervals, the apparatus comprising: means for supporting the first and second type recording media; first reproducing means for reproducing information recorded on a header portion of the recording medium supported by the support means by means of a first method designed for reproducing information from the second type recording medium; first determining means for determining that the recording medium supported by the support means is the second type recording medium when the first reproducing means is able to reproduce information from the recording medium supported by the support means; second reproducing means for reproducing information recorded on a header portion of the recording medium supported by the support means by means of a second method designed for reproducing information from the first type recording medium; and second determining means for determining that the recording medium supported by the support means is the first type recording medium when the second reproducing means is able to reproduce information from the recording medium supported by the support means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 2A and 2B are diagrams for explaining optical disks employing different recording schemes;

FIGS. 3A and 3B are diagrams for explaining cartridges storing the optical disks employing the different recording schemes;

FIGS. 4A to 4M are signal charts for explaining signal waveforms at respective portions of the optical disk apparatus;

FIGS. 5A to 5D are flow charts for explaining an operation of discriminating the recording scheme of an optical disk;

FIGS. 6A and 6B are flow charts for explaining an operation of recording/reproducing information on and from an optical disk employing the mark length recording scheme;

DETAILED DESCRIPTION OF THE PREFERRED EMBODIMENTS

The preferred embodiments of the present invention will be described with reference to the accompanying drawings.

Figure 1:
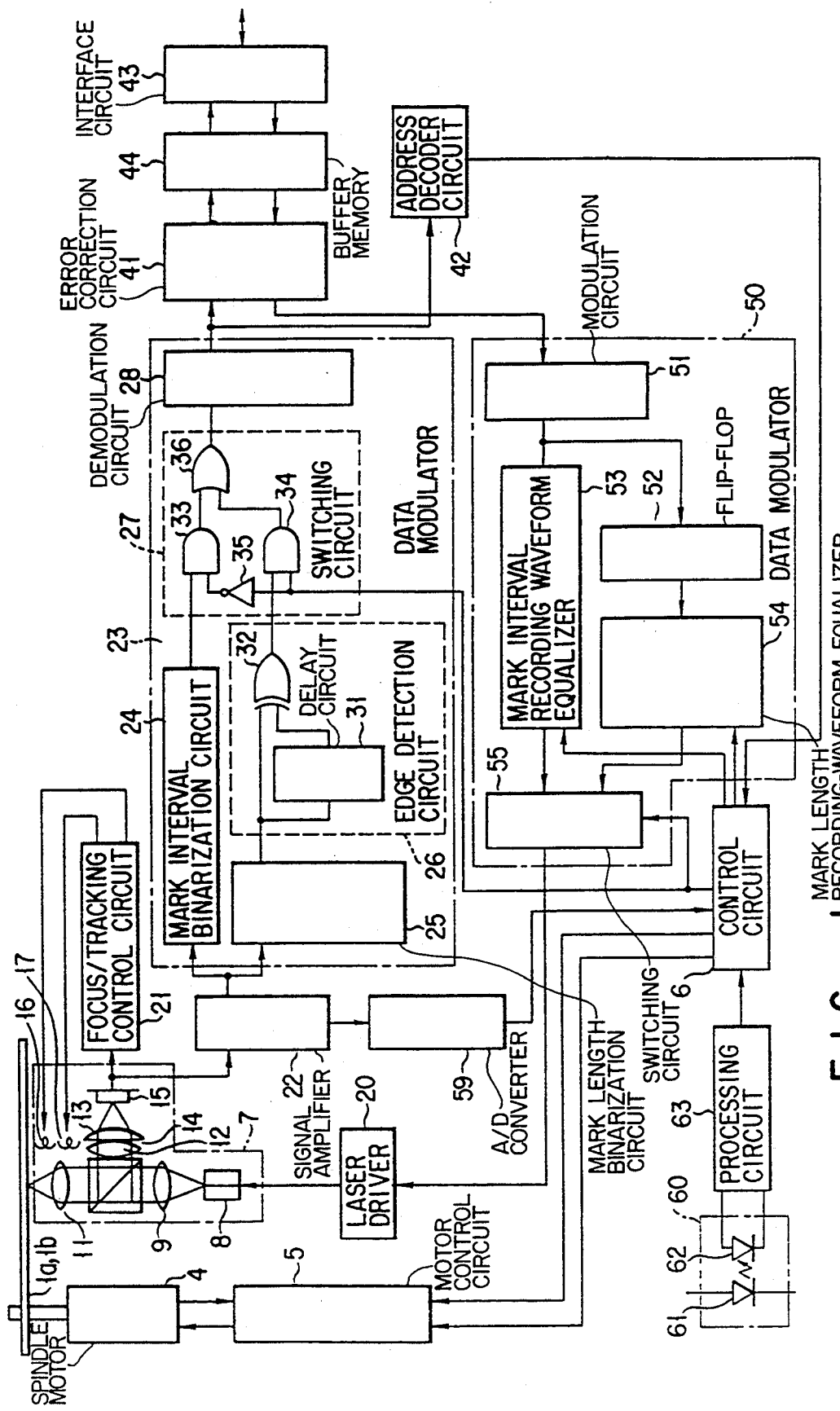
FIG. 1 is a block diagram showing the arrangement of an optical disk apparatus according to an embodiment of the present invention.
Figure 5B:
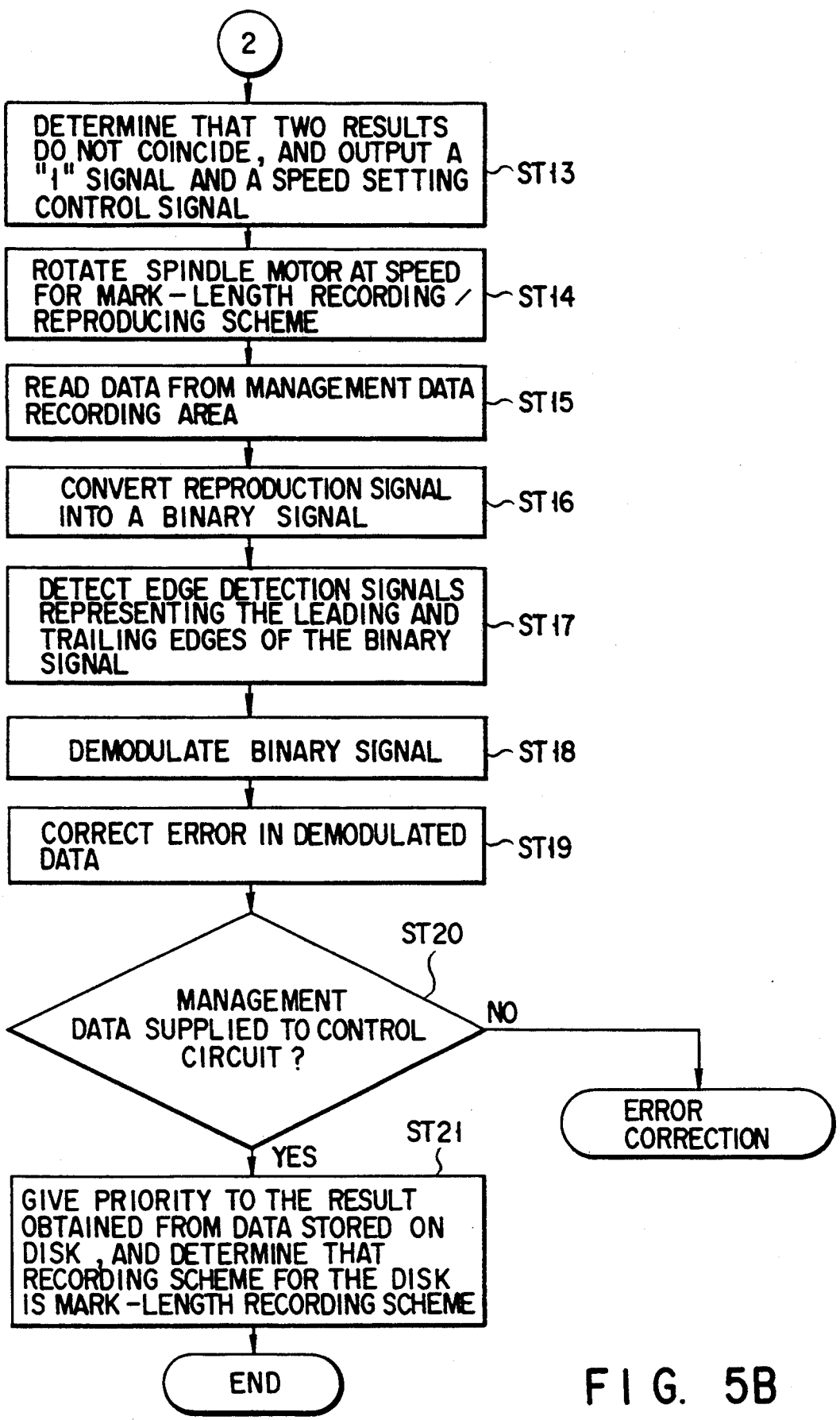
Figure 5C:
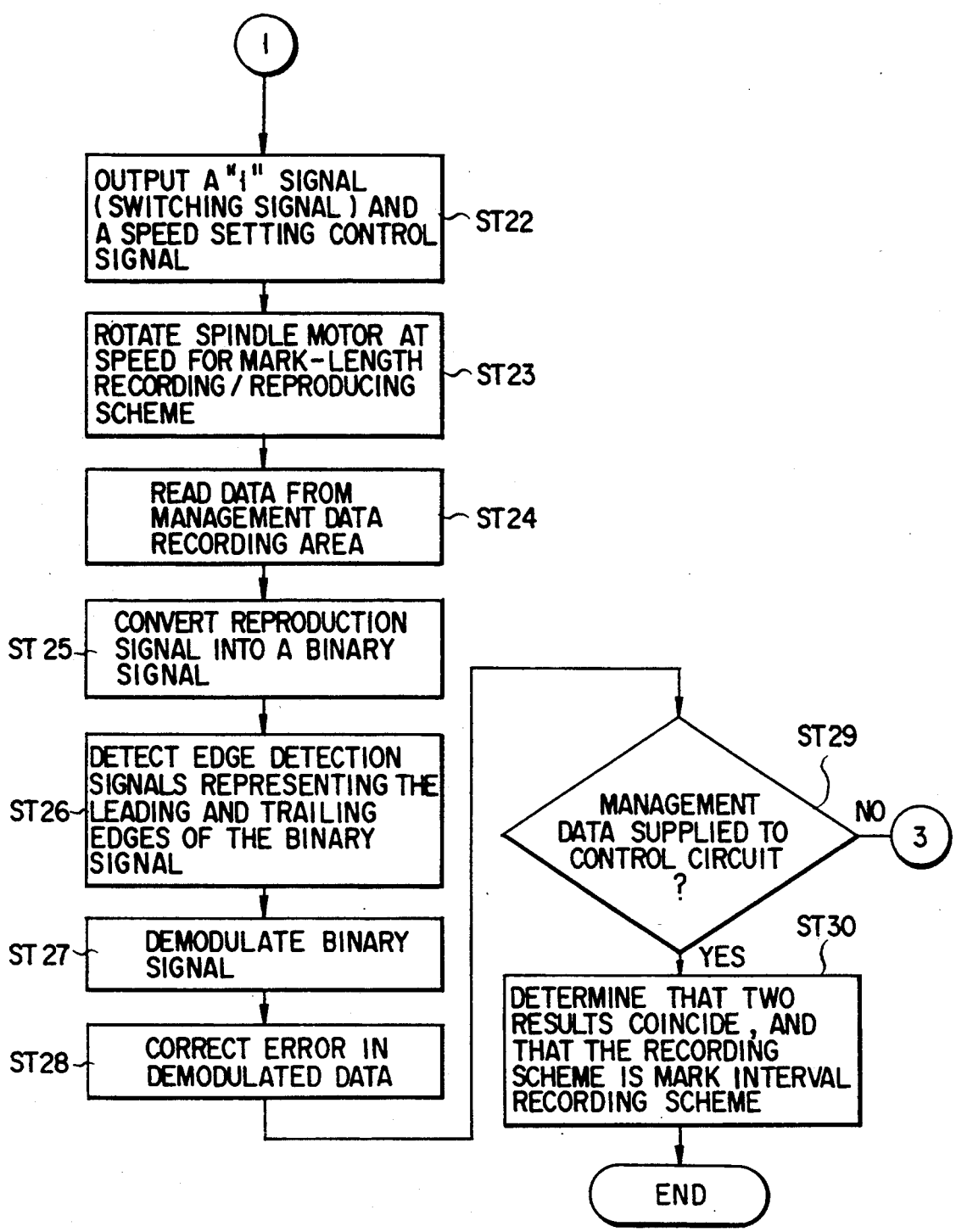
Figure 5D:
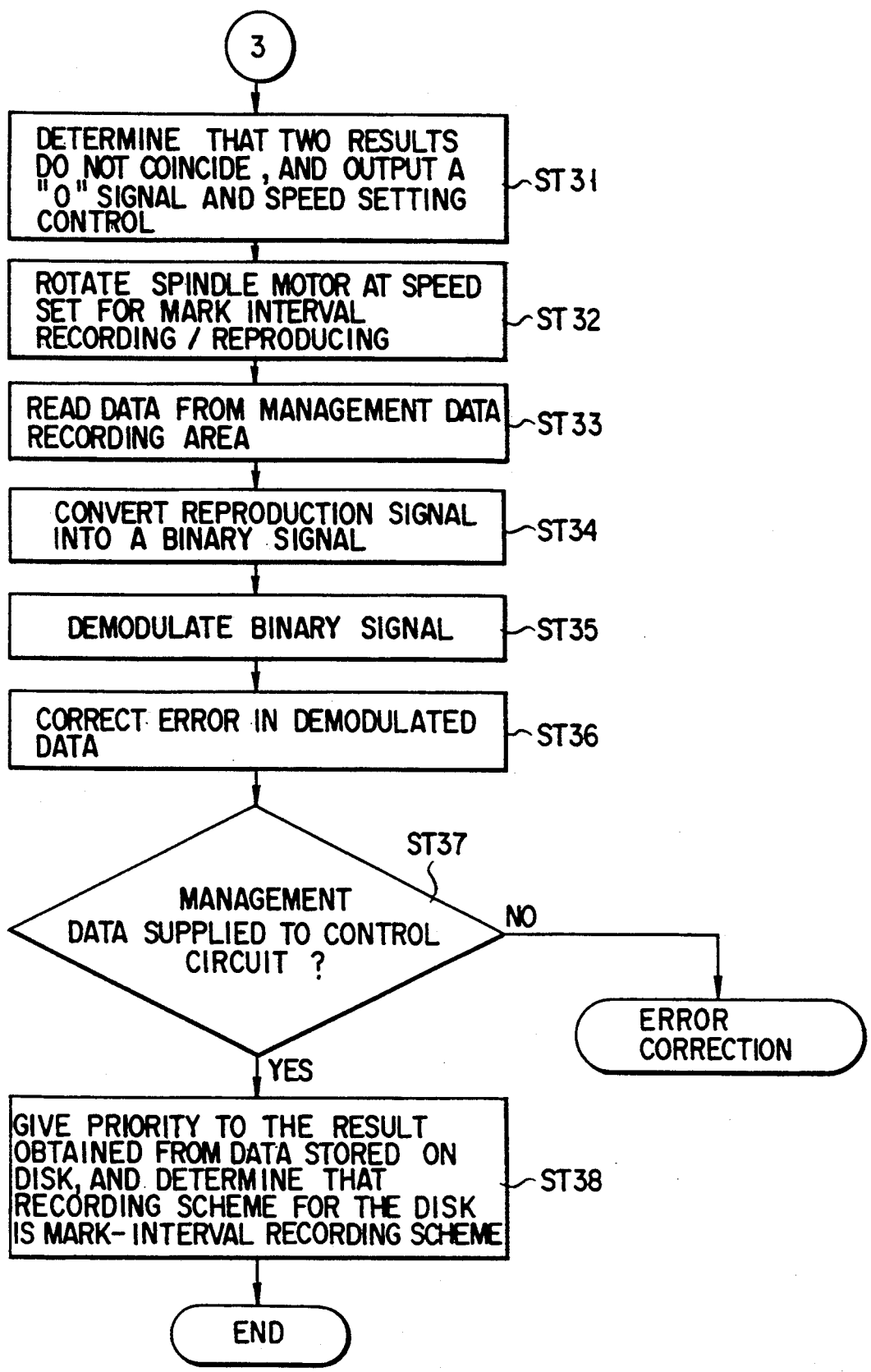

FIG. 1 shows the schematic arrangement of an optical disk apparatus as an example of an information recording/reproducing apparatus according to the present invention. An optical disk serving as the information recording medium used in this optical disk apparatus is fabricated by annularly forming a metal coating layer of, e.g., tellurium or bismuth, on the surface of, e.g., a circular glass or plastic substrate.

Examples of such an optical disk are an optical disk 1a, as shown in FIG. 2A, employing the mark interval (pit position) recording scheme, and an optical disk 1b, as shown in FIG. 2B, employing the mark length recording scheme.

Headers 81 and 82 serving as the address information portions are formed on the corresponding optical disks 1a and 1b in the embossed state and preformatted.

In addition, management data recording areas 83 and 84 in which management data representing recording schemes are recorded in advance are formed in the specific address regions of the optical disks 1a and 1b, respectively, and each of the management data recording areas 83 and 84 is used as an identifier which specifies a recording scheme.

The mark length recording type optical disk 1b can record information about twice that recorded on the mark interval recording type optical disk 1a, and the number of headers (address information portions) 82 formed per track on the mark length recording type optical disk 1b is about twice that of the headers 81 on the mark interval recording type optical disk 1a.

The mark interval recording type optical disk 1a and the mark length recording type optical disk 1b have different numbers of sectors, different numbers of addresses, different numbers of headers, and so on, and are respectively stored in cartridges 2 and 3 shown in FIGS. 3A and 3B. The outer sizes of the two types of cartridges 2 and 3 are the same, and the cartridge 3 is provided with an identifier 3a indicating that the recording scheme of the optical disk 1b stored in the cartridge 3 is the mark length recording scheme.

The cartridges 2 and 3 in which the optical disks 1a and 1b are stored are detachably provided to a spindle motor 4. The spindle motor 4 is rotated at a predetermined rotational speed, and the start, stop, and change in rotational speed of the spindle motor 4 are controlled by a control signal output from a spindle motor control circuit 5.

The spindle motor control circuit 5 outputs the control signal in accordance with two different control signals output from a control circuit 6, so that the spindle motor control circuit 5 accurately rotates the spindle motor 4 at two different rotational speeds.

A ratio of a rotational speed in mark interval recording to a rotational speed in mark length recording is about 2:1.

The rotational speed of the spindle motor 4 must be changed due to the following reason. When information is recorded/reproduced on and from recording media having different recording schemes by the same information recording/reproducing apparatus, the smaller the number of sets of two parallel circuits, the better. Even when the recording scheme is different, as far as the data transfer rate in recording/reproduction stays the same, data processing can be performed by the same circuits. In processing of the reproduction signal, if the reproduction signal has the same frequency band, most of the circuits can be commonly used between the different recording schemes.

The mark length recording scheme has a recording density almost twice that of the mark interval recording scheme. Therefore, in order to set the data transfer rate or the frequency band of the reproduction signal substantially equal to that in the mark interval recording scheme, the rotational speed must be decreased in mark length recording as compared to that in mark interval recording. when the rotational speed is set to be inversely proportional to the recording density, the number of circuit components can be decreased for the both recording schemes.

When the recording scheme is different, the characteristics of the recording film suitable for the recording scheme are different. Thus, an optimum rotational speed must be changed accordingly.

The control circuit 6 comprises, e.g., a microcomputer and a memory, and manages control over the rotation of the spindle motor 4 and various other control operations to be described later.

An optical head 7 is arranged on the lower side of the optical disk 1a or 1b. The optical head 7 records/reproduces information on/from the optical disk 1a or 1b. The optical head 7 comprises a semiconductor laser oscillator 8, a collimator lens 9, a beam splitter 10, an objective lens 11, a known astigmatism optical system 14 consisting of a cylindrical lens 12 and a convex lens 13, a photodetector 15, lens actuators 16 and 17, and the like.

The optical head 7 is arranged to be movable by a moving mechanism (not shown) constituted by, e.g., a linear motor in the radial direction of the optical disk 1a or 1b. The optical head 7 is moved to a target track as the recording or reproduction target in accordance with a designation from the control circuit 6.

The semiconductor laser oscillator 8 generates a divergent laser beam in accordance with a drive signal output from a laser driver 20. When information is to be recorded on the optical disk 1a or 1b, the semiconductor laser oscillator 8 generates a laser beam having a modulated intensity in accordance with the information to be recorded. when information is to be read from the optical disk 1a or 1b and reproduced, the semiconductor laser oscillator 8 generates a laser beam having a predetermined intensity.

The divergent laser beam generated by the semiconductor laser oscillator 8 is converted into a parallel beam by the collimator lens 9 and guided to the beam splitter 10. The laser beam guided to the beam splitter 10 is transmitted through the beam splitter 10 to be incident on the objective lens 11, and is focused by the objective lens 11 toward the recording film of the optical disk 1a or 1b.

The objective lens 11 is supported by the lens actuator 16 serving as the lens driving mechanism to be movable along its optical axis. When the objective lens 11 is moved along its optical axis by a focus servo signal output from a focus/tracking control circuit 21, the convergent laser beam transmitted through the objective lens 11 is projected on the surface of the optical disk 1a or 1b, and a minimum beam spot is formed on the surface of the recording film of the optical disk 1a or 1b. In this state, the objective lens 11 is set in an in-focus state.

The objective lens 11 can be moved by the lens actuator 17 also in a direction perpendicular to the optical axis. The objective lens 11 is moved in accordance with a tracking servo signal from the focus/tracking control circuit 21 in the direction perpendicular to the optical axis.

The convergent laser beam transmitted through the objective lens 11 is projected on the surface of the recording film of the optical disk 1a or 1b, and is radiated on the recording track formed on the surface of the recording film of the optical disk 1a or 1b. In this state, the objective lens 11 is set to serve the tracking.

As long as the lens 11 remains in-focus state, and tracking state information can be recorded and read.

In the in-focus state, the divergent laser beam reflected by the optical disk 1a or 1b is converted into a parallel beam by the objective lens 11, and is returned to the beam splitter 10. The parallel beam is reflected by the beam splitter 10 and guided to the photodetector 15 by the astigmatism optical system 14 consisting of the cylindrical lens 12 and the convex lens 13, and a focusing error appears as a change in shape of the image. A tracking error is detected in accordance with the known dual push-pull scheme.

The photodetector 15 is constituted by four photodetection cells (not shown) for converting light, which is formed into an image by the astigmatism optical system 14, into an electrical signal. A signal output from the photodetector 15 is supplied to the focus/tracking control circuit 21 and a signal amplifier 22.

In the focus/tracking control circuit 21, the signal from the photodetector 15 is input to a focus servo circuit (not shown) to generate a focus error signal, and is supplied to the lens actuator 16, thus forming a focus servo loop. The signal from the photodetector 15 is input also to a tracking servo circuit (not shown) to generate a tracking error signal, and is supplied to the lens actuator 17, thus forming a tracking servo loop.

The signal output from the photodetector 15 represents information recorded on the optical disk 1a or 1b, and is amplified by the signal amplifier 22 and output to a data demodulator 23.

The signal amplifier 22 outputs a mark interval recording/reproduction signal, as shown in FIG. 4H, corresponding to a mark interval recording pit recorded on the optical disk 1a, as shown in FIG. 4F. For a mark length recording pit recorded on the optical disk 1b, as shown in FIG. 4G, the signal amplifier 22 outputs a mark length recording/production signal, as shown in FIG. 4I.

In response to a switching signal from the control circuit 6, the data demodulator 23 demodulates a signal output from the signal amplifier 22 in accordance with the mark interval or mark length recording scheme.

For example, the data demodulator 23 comprises a mark interval binarization circuit 24, a mark length binarization circuit 25, an edge detection circuit 26, a switching circuit 27, and a demodulation circuit 28.

The mark interval binarization circuit 24 binarizes a signal from the signal amplifier 22 by peak detection. A mark interval recording/reproduction signal from the mark interval binarization circuit 24 is output to the switching circuit 27.

For example, the mark interval binarization circuit 24 binarizes the mark interval recording/reproduction signal, as shown in FIG. 4H, to a mark interval binary signal, as shown in FIG. 4J.

The mark length binarization circuit 25 binarizes the signal output from the signal amplifier 22 with reference to its central level as a threshold. For example, the mark length binarization circuit 25 binarizes the mark length recording/reproduction signal, as shown in FIG. 4I, to a mark length binary signal, as shown in FIG. 4K. The mark length recording/reproduction signal from the mark length binarization circuit 25 is output to the edge detection circuit 26.

The edge detection circuit 26 outputs an edge detection signal, as shown in FIG. 4M, corresponding to the leading and trailing edges of the mark length binary signal, as shown in FIG. 4K, output from the mark length binarization circuit 25.

The edge detection circuit 26 comprises a delay circuit 31 and an exclusive OR circuit 32.

The delay circuit 31 delays the mark length binary signal from the mark length binarization circuit 25, as shown in FIG. 4K, to be a signal, as shown in FIG. 4L, and outputs the delay signal to the exclusive OR circuit 32.

The exclusive OR circuit 32 outputs an exclusive OR of the mark length binary signal (FIG. 4K) from the mark length binarization circuit 25 and the delay signal (FIG. 4L) delayed by the delay circuit 31 as an edge detection signal (FIG. 4M).

The edge detection signal from the edge detection circuit 26, i.e., from the exclusive OR circuit 32 is output to the switching circuit 27.

The switching circuit 27 selectively outputs the mark interval recording/reproduction signal from the mark interval binarization circuit 24 and the edge detection signal from the edge detection circuit 26 in accordance with the switching signal supplied from the control circuit 6.

The switching circuit 27 comprises AND circuits 33 and 34, an inverter circuit 35, and an OR circuit 36.

When a "1" signal is supplied from the control circuit 6 to the switching circuit 27 as the switching signal, the gate of the AND circuit 34 is opened, and the edge detection signal from the edge detection circuit 26 is output to the demodulation circuit 28. When a "0" signal is supplied from the control circuit 6 to the switching circuit 27 as the switching signal, the gate of the AND circuit 33 is opened, and the mark interval recording/reproduction signal from the mark interval binarization circuit 24 is output to the demodulation circuit 28.

The demodulation circuit 28 demodulates the mark interval recording/reproduction signal or the edge detection signal from the switching circuit 27 in accordance with inverse 2-7 code conversion.

An output from the data demodulator 23, i.e., the demodulated data from the demodulation circuit 28 is output to an error correction circuit 41 and an address decoder circuit 42.

The error correction circuit 41 corrects an error in the demodulated data from the demodulation circuit 28, or adds an error correction code to the recording data, supplied from an interface circuit 43 through a buffer memory 44, and outputs the new recording data to a modulation circuit 51 in a data modulator 50.

The demodulated data, supplied from the demodulation circuit 28, for the management data recording area 83 (84) is output to the control circuit 6 by the error correction circuit 41.

The address decoder circuit 42 reads an address from the demodulated data demodulated by the demodulation circuit 28. The decoding result of the address is output to the control circuit 6.

The interface circuit 43 outputs reproduction data, supplied from the error correction circuit 41 through the buffer memory 44, to the host computer as an external unit, or outputs recording data supplied from the external unit to the error correction circuit 41 through the buffer memory 44.

Upon reception of the switching signal from the control circuit 6, the data modulator 50 performs modulation, recording waveform equalization, and the like in accordance with the mark interval or mark length recording scheme.

For example, the data modulator 50 comprises the modulation circuit 51, a flip-flop circuit 52, a mark interval recording waveform equalizer 53, a mark length recording waveform equalizer 54, and a switching circuit 55.

The modulation circuit 51 modulates the recording data supplied from the error correction circuit 41 to a signal suitable for recording, i.e., 2-7 modulation data (see FIG. 4A).

The 2-7 modulation data from the modulation circuit 51 is output to the flip-flop circuit 52 and the mark interval recording waveform equalizer 53.

The flip-flop circuit 52 changes the 2-7 modulation data from the modulation circuit 51, as shown in FIG. 4B, to mark length data, as shown in FIG. 4C, and outputs it to the mark length recording waveform equalizer 54.

The mark interval recording waveform equalizer 53 is a recording compensation circuit, and equalizes the recording waveform of the modulation data from the modulation circuit 51 by adjusting its amplitude and width in accordance with a recording position (an address supplied from the control circuit 6) on the optical disk 1a, so that the mark interval recording scheme pits are formed on the optical disk 1a as accurately as possible. Then, a mark interval recording waveform, as shown in FIG. 4D, is obtained from the 2-7 modulation data from the modulation circuit 51, as shown in FIG. 4B.

The mark length recording waveform equalizer 54 is a recording compensation circuit, and equalizes the recording waveform of the output waveform of the flip-flop circuit 52 by performing thermal control in accordance with the recording length, so that the mark length recording scheme pits are formed on the optical disk 1b as accurately as possible to correspond to the modulation data from the modulation circuit 51.

More specifically, the mark length recording waveform equalizer 54 does not set the pulse length to "1" over the entire pit width, but temporarily sets the pulse length to "0" (to intermittent pulses), thus preventing an excessive heat increase. Then, a mark length recording waveform, as shown in FIG. 4D, can be obtained from the mark length data from the flip-flop circuit 52, as shown in FIG. 4C.

The recording waveform of the mark interval recording waveform equalizer 53 and the recording waveform of the mark length recording waveform equalizer 54 are supplied to the switching circuit 55.

The switching circuit 55 selectively outputs the recording waveform from the mark interval recording waveform equalizer 53 and the recording waveform from the mark length recording waveform equalizer 54 in response to the switching signal supplied from the control circuit 6.

The mark interval recording waveform or the mark length recording waveform from the switching circuit 55 is output to the laser driver 20.

Then, when the laser driver 20 is controlled by the mark interval recording waveform, the mark interval recording scheme pits, as shown in FIG. 4F, are formed on the optical disk 1a. When the laser driver 20 is controlled by the mark length recording waveform, (see FIG. 4E) the mark length recording scheme pits, as shown in FIG. 4G, are formed on the optical disk 1b.

On each of innermost regions 71 and 72 of the optical disks 1a and 1b shown in FIGS. 2A and 2B employing the different recording schemes, there exists a portion called a mirror portion, which is outside the information recording region and in which no guide groove (track) is formed. Since a recording film is formed on this region (mirror portion) 71 or 72 by coating, the reflectivity of the recording film can be measured at this portion.

More specifically, the focus/tracking control circuit 21 is actuated to perform focusing. The light reflected by the mirror portion 71 or 72 is reflected by the beam splitter 10 through the objective lens 11, is subjected to photoelectric conversion by the photodetector 15, and is amplified by the signal amplifier 22. The amplified signal is digitized by an A/D converter 59 and supplied to the control circuit 6. Thus, the control circuit 6 measures the reflectivity from the supplied digital data, and discriminates the recording scheme of the optical disk 1a or 1b in accordance with whether the reflectivity is higher or lower than a predetermined reflectivity.

Conventionally, since the optical disk 1a used for mark interval recording is partially melted and recessed by the laser beam to form a pit (FIG. 4F), the pit does not reflect light. Hence, the conventional recording film of the mark interval recording scheme generally has a high reflectivity (50 to 40%).

On the other hand, for the optical disk 1b for mark length recording, recording which is done by recessing of a recording film is not suitable, and recording which is done by a change from an amorphous state to a crystal state or alloying recording by diffusion between two recording films is suitable. The reflectivity of such a recording film is about 10 to 20%.

Hence, when the light reflected by the mirror portion 71 or 72 is obtained by the control circuit 6 through the A/D converter 59, if the supplied reflectivity is high, the control circuit 6 determines that the optical disk 1a of the mark interval recording scheme is mounted; when the supplied reflectivity is low, the control circuit 6 determines that the optical disk 1b of the mark length recording scheme is mounted.

A detector 60 is provided for detecting the identifier 3a representing the recording scheme of the optical disk 1a or 1b stored in the cartridge 2 or 3 mounted on the spindle motor 4. For example, the detector 60 comprises a light source 61, e.g., a light-emitting diode, and a photodetection element 62. The detection output of the detector 60 is supplied to a recording scheme discrimination circuit 63.

The recording scheme discrimination circuit 63 discriminates whether the optical disk 1a or 1b is of the mark interval (pit position) recording scheme or the mark length recording scheme from the detection output from the detector 60, and comprises a comparator or the like. The discrimination result of the recording scheme discrimination circuit 63 is output to the control circuit 6. When the discrimination result indicates the mark length recording scheme, the recording scheme discrimination circuit 63 outputs a "1" signal; when it indicates the mark interval recording scheme, the discrimination circuit 63 outputs a "0" signal.

When the output from the recording scheme discrimination circuit 63 is a "1" signal, the control circuit 6 discriminates that the optical disk 1b of the mark length recording scheme is mounted. when the output from the recording scheme discrimination circuit 63 is a "0" signal, the control circuit 6 discriminates that the optical disk 1a of the mark interval recording scheme is mounted.

When it is determined that the mark interval recording scheme optical disk 1a is mounted, the control circuit 6 successively performs recording and reproduction on and from the optical disk 1a.

When it is determined that the mark length recording scheme optical disk 1b is mounted, the control circuit 6 successively performs recording and reproduction on and from the optical disk 1b.

The operation of discriminating the recording scheme of the mounted optical disk 1a or 1b in the arrangement as described above will be described with reference to the flow charts shown in FIGS. 5A to 5D.

First, the cartridge 2 in which the optical disk 1a is stored or the cartridge 3 in which the optical disk 1b is stored is mounted on the spindle motor 4 (ST1).

The presence/absence of the identifier 3a is detected by the detector 60 (ST2), and a detection signal in accordance with the presence/absence is supplied to the recording scheme discrimination circuit 63.

when a detection signal corresponding to the absence of the identifier 3a is supplied from the detector 60, the recording scheme discrimination circuit 63 determines the mark length recording scheme and outputs the discrimination result of the recording scheme to the control circuit 6 (ST3). When a detection signal corresponding to the presence of the identifier 3a is supplied from the detector 60, the recording scheme discrimination circuit 63 determines the mark length recording scheme and outputs the discrimination result of the recording scheme (ST4).

When the mark interval recording scheme is determined in step 3, the control circuit 6 outputs a "0" signal as a switching signal to the switching circuits 27 and 55 and outputs the rotational speed setting control signal for mark interval recording to the motor control circuit 5 (ST5).

As a result, the spindle motor 4 is rotated at a rotational speed for mark interval recording/reproduction, and mark interval recording/reproduction is enabled (ST6).

In this state, reading of the management data in the management data recording area 83 (84) is started at a position shifted from the innermost position of the optical disk 1a (1b) by a predetermined number of tracks, i.e., a position corresponding to the management data recording area 83 (84) (ST7).

The management data in the management data recording area 83 (84) of the optical disk 1a (1b) is photoelectrically converted by the photodetector 15 in the optical head 7 and amplified by the signal amplifier 22, thereby outputting a reproduction signal. This reproduction signal is binarized by the mark interval binarization circuit 24 to be a binary signal (ST8).

An output from the mark interval binarization circuit 24 is supplied to the demodulation circuit 28 through the switching circuit 27. The demodulation circuit 28 demodulates the binary signal in accordance with inverse 2–7 code conversion and outputs the demodulated data to the error correction circuit 41 (ST9).

The error correction of the demodulated data is performed by the error correction circuit 41, and a read result after the error correction is performed is output to the control circuit 6 (ST10).

As a result, when management data serving as a read result from the error correction circuit 41 is supplied to the control circuit 6 (ST11), the control circuit 6 determines that the discrimination result obtained by the identifier of the cartridge coincides with the discrimination result obtained by the management data recorded on the optical disk, and determines that the recording scheme of the optical disk is the mark interval recording scheme (ST12).

In step 11, when no management data serving as the read result from the error correction circuit 41 is supplied to the control circuit 6, the control circuit 6 determines that the discrimination result obtained by the identifier of the cartridge does not coincide with the discrimination result obtained by the management data recorded on the optical disk, and determines that the management data is read in accordance with a recording scheme (mark length recording scheme) different from the mark interval recording scheme. In addition, a "1" signal is output to the switching circuits 27 and 55 as a switching signal, and a rotational speed setting control signal for mark length recording is output to the motor control circuit 5 (ST13).

As a result, the spindle motor 4 is rotated by the motor control circuit 5 at a rotational speed for mark length recording/reproduction, and mark length recording/reproduction is enabled (ST14).

In this state, reading of the management data in the management data recording area 83 (84) is started at a position shifted from the innermost position of the optical disk 1a (1b) by a predetermined number of tracks, i.e., a position corresponding to the management data recording area 83 (84) (ST15).

The management data in the management data recording area 83 (84) of the optical disk 1a (1b) is photoelectrically converted by the photodetector 15 in the optical head 7 and amplified by the signal amplifier 22, thereby outputting a reproduction signal. This reproduction signal is binarized by the mark interval binarization circuit 25 to be a binary signal (ST16).

An output from the mark length binarization circuit 25 is supplied to the edge detection circuit 26, and an edge detection signal corresponding to the leading and trailing edges of the binary signal is detected (ST17). The edge detection signal from the edge detection circuit 26 is supplied to the demodulation circuit 28 through the switching circuit 27. The demodulation circuit 28 demodulates the supplied edge detection signal in accordance with inverse 2–7 code conversion and outputs the demodulated data to the error correction circuit 41 (ST18).

The error correction of the demodulated data is performed by the error correction circuit 41, and a read result after the error correction is performed is output to the control circuit 6 (ST19).

As a result, when management data serving as the read result from the error correction circuit 41 is supplied to the control circuit 6 (ST20), and the discrimination result obtained by the management data recorded on the optical disk has priority over that of the discrimination result obtained by the identifier of the cartridge, it is determined that the recording scheme of the optical disk is a mark length recording scheme (ST21).

If no management data serving as a read result from the error correction circuit 41 is supplied to the control circuit 6 in step 20, this state is displayed as erroneous processing by a display means (not shown).

If the mark length recording scheme is determined in step 4, the control circuit 6 outputs a "1" signal as a switching signal to the switching circuits 27 and 55, and outputs a rotational speed setting control signal for mark length recording to the motor control circuit 5 (ST22).

AS a result, the spindle motor 4 is rotated by the motor control circuit 5 at a rotational speed for mark length recording/reproduction, and mark interval recording/reproduction is enabled (ST23).

In this state, reading of the management data in the management data recording area 83 (84) is started at a position shifted from the innermost position of the optical disk 1a (1b) by a predetermined number of tracks, i.e., a position corresponding to the management data recording area 83 (84) (ST24).

The management data in the management data recording area 83 (84) of the optical disk 1a (1b) is photoelectrically converted by the photodetector 15 in the optical head 7 and amplified by the signal amplifier 22, thereby outputting a reproduction signal. This reproduction signal is binarized by the mark length binarization circuit 25 to be a binary signal (ST25).

An output from the mark length binarization circuit 25 is supplied to the edge detection circuit 26, and an edge detection signal corresponding to the leading and trailing edges of the binary signal is detected (ST26). The edge detection signal from the edge detection circuit 26 is supplied to the demodulation circuit 28 through the switching circuit 27. The demodulation circuit 28 demodulates the supplied edge detection signal in accordance with inverse 2-7 code conversion and outputs the demodulated data to the error correction circuit 41 (ST27).

The error correction of the demodulated data is performed by the error correction circuit 41, and a read result after the error correction is performed is output to the control circuit 6 (ST28).

As a result, when management data serving as the read result from the error correction circuit 41 is supplied to the control circuit 6 (ST29), the control circuit determines that the discrimination result obtained by the identifier of the cartridge coincides with the discrimination result obtained by the management data recorded on the optical disk, and determines that the recording scheme of the optical disk is the mark length recording scheme (ST30).

If no management data serving as a read result from the error correction circuit 41 is supplied to the control circuit 6 in step 29, the control circuit 6 determines that the discrimination result obtained by the identifier of the cartridge does not coincide with the discrimination result obtained by the management data recorded on the optical disk, and determines that the management data is read in accordance with a recording scheme (mark interval recording scheme) different from the mark length recording scheme. In addition, the control circuit 6 outputs a "0" signal as a switching signal to the switching circuits 27 and 55, and a rotational speed setting control signal for mark interval recording is output to the motor control circuit 5 (ST31).

As a result, the spindle motor 4 is rotated by the motor control circuit 5 at a rotational speed for mark interval recording/reproduction, and mark interval recording/reproduction is enabled (ST32).

In this state, reading of the management data in the management data recording area 83 (84) is started at a position shifted from the innermost position of the optical disk 1a (1b) by a predetermined number of tracks, i.e., a position corresponding to the management data recording area 83 (84) (ST33).

The management data in the management data recording area 83 (84) of the optical disk 1a (1b) is photoelectrically converted by the photodetector 15 in the optical head 7 and amplified by the signal amplifier 22, thereby outputting a reproduction signal. This reproduction signal is binarized by the mark interval binarization circuit 24 to be a binary signal (ST34).

An output from the mark interval binarization circuit 24 is supplied to the demodulation circuit 28 through the switching circuit 27. The demodulation circuit 28 demodulates the binary signal in accordance with inverse 2-7 code conversion and outputs the demodulated data to the error correction circuit 41 (ST35).

The error correction of the demodulated data is performed by the error correction circuit 41, and a read result after the error correction is performed is output to the control circuit 6 (ST36).

As a result, when management data serving as the read result from the error correction circuit 41 is supplied to the control circuit 6 (ST37), and the discrimination result obtained by the management data recorded on the optical disk has priority over that of the discrimination result obtained by the identifier of the cartridge, it is determined that the recording scheme of the optical disk is a mark interval recording scheme (ST38).

If no management data serving as a read result from the error correction circuit 41 is supplied to the control circuit 6 in step 37, this state is displayed as erroneous processing by a display means (not shown).

Therefore, the presence/absence of the identifier 3a of the cartridge 2 or 3 is determined, and a signal processing circuit is switched in accordance with the control signal from the control circuit 6 to read the management data representing the above recording scheme. When the recording scheme obtained by the management data coincides with the discrimination result of the identifier 3a of the cartridge 2 or 3, a recording scheme is specified, thereby performing more reliable discrimination.

For this reason, when a recording scheme is determined at the time of mounting the cartridge 2 or 3 in the spindle motor 4, since a change in rotational speed of the spindle motor 4 corresponding to the recording scheme and the switching of the signal processing circuit are performed in advance, an operation can be quickly switched to a recording or reproducing operation of information.

However, when a recording scheme is determined by only the presence/absence of the identifier 3a of the cartridge 2 or 3, if the detector 60 fails, or if an optical disk is erroneously stored in the cartridge, data may be recorded on one optical disk in accordance with an erroneous recording scheme.

For this reason, as described above, the optical head 7 reads the discrimination result of the identifier in the cartridge and the management data representing a recording scheme on an optical disk to perform discrimination, and the discrimination of a recording scheme is performed when the discrimination result of the identifier coincides with the discrimination result of the management data. However, the discrimination results may be different from each other due to the reasons as described above. In addition, the management data representing a recording scheme on the optical disk may not be read.

When the different discrimination results are obtained, or when the management data cannot be read, a change in recording scheme and resetting of the recording scheme are performed by the control circuit 6. That is, the rotational speed is changed and reset, and the signal processing circuit is switched. In this manner, the management data representing a recording scheme on the optical disk is read through the optical head 7 again. At this time, priority is given to the discrimination result which can be read, any one of a mark length recording scheme and a mark interval recording scheme is determined, and information is recorded or reproduced in accordance with the determined recording scheme.

In the above embodiment, a case wherein a recording scheme is determined depending on the presence/absence of the identifier 3a of the cartridge 2 or 3 and on whether the management data representing a recording scheme on an optical disk can be read has been described. The present invention is not limited to the embodiment. For example, the recording scheme may be determined depending on the presence/absence of the identifier 3a of the cartridge 2 or 3 and on whether an address in a header recorded on an optical disk can be read. In this case, demodulated data is output to the address decoder circuit 42, the read result of an address obtained by the address decoder circuit 42 is output to the control circuit 6, and the control circuit 6 determines a recording scheme depending on whether the address can be read.

In this case, the discrimination result obtained by reading the address has priority over that of the discrimination result obtained by determining the presence/absence of the identifier 3a of the cartridge 2 or 3.

An operation of recording/reproducing information performed when the control circuit 6 discriminates that the optical disk 1b of the mark length recording scheme is mounted will be described with reference to the flow charts of FIGS. 6A and 6B.

That is, during recording, digital data (recording data) is supplied from the host computer through the interface circuit 43, and is supplied to the error correction circuit 41 through the buffer memory 44 (ST41). The error correction circuit 41 adds a correction code to the supplied recording data, and outputs the new recording data to the modulation circuit 51 (ST42). The modulation circuit 51 modulates the supplied recording data to the 2–7 modulation data, as shown in FIG. 4B, and outputs it to the flip-flop circuit 52 (ST43). The flip-flop circuit 52 converts the 2–7 modulation data to the mark length data, as shown in FIG. 4C, and outputs it to the mark length recording waveform equalizer 54 (ST44).

The mark length recording waveform equalizer 54 converts the supplied mark length data to a signal having a mark length recording waveform, as shown in FIG. 4E (ST45). The signal having this mark length recording waveform is supplied to the laser driver 20 through the switching circuit 55.

The laser driver 20 modulates the drive current of the semiconductor laser oscillator 8 in accordance with the supplied mark length recording waveform (ST46).

Then, a laser beam corresponding to the mark length recording waveform is radiated on the optical disk 1b through the collimator lens 9, the beam splitter 10, and the objective lens 11, and a mark length recording pit, as shown in FIG. 4G, is formed on the optical disk 1b (ST47).

During reproduction, the mark length recording scheme pit (FIG. 4G) formed on the optical disk 1b is subjected to photoelectric conversion by the photodetector 15 in the optical head 7 and amplified by the signal amplifier 22, and a mark length recording/reproduction signal, as shown in FIG. 4I, is output (ST48). This mark length recording/reproduction signal is binarized by the mark length binarization circuit 25 to be a mark length binary signal, as shown in FIG. 4K (ST49).

An output from the mark length binarization circuit 25 is supplied to the edge detection circuit 26, and an edge detection signal corresponding to the leading and trailing edges of the mark length binary signal, as shown in FIG. 4M, is detected (ST50). The edge detection signal is supplied from the edge detection circuit 26 to the demodulation circuit 28 through the switching circuit 27. The demodulation circuit 28 demodulates the supplied edge detection signal in accordance with inverse 2–7 code conversion, and outputs it to the error correction circuit 41 and the address decoder circuit 42 (ST51).

The address decoder circuit 42 performs address reading. The read result is output to the control circuit 6. Simultaneously, the demodulated data is corrected by the error correction circuit 41 and output as the reproduction data to the host computer through the buffer memory 44 and the interface circuit 43 (ST52).

Figure 7A:
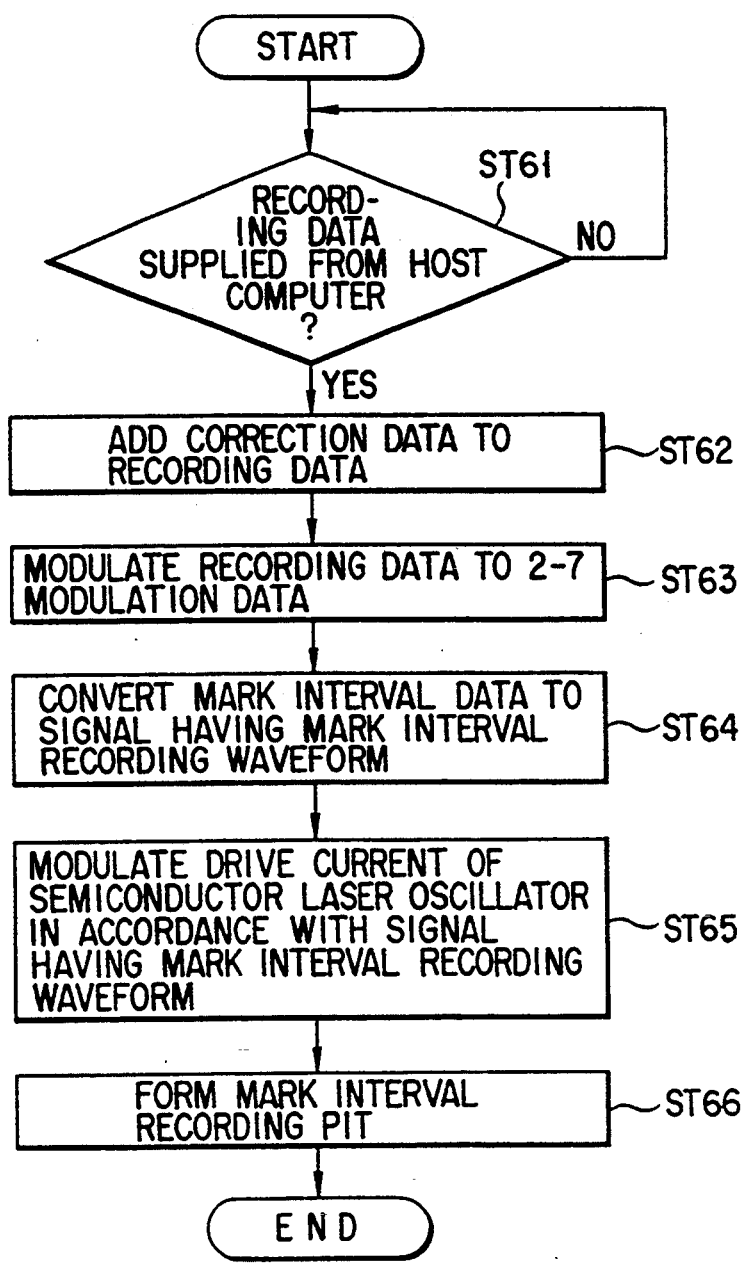
FIGS. 7A and 7B are flow charts for explaining an operation of recording/reproducing information on and from an optical disk employing the mark interval recording scheme.
Figure 7B:
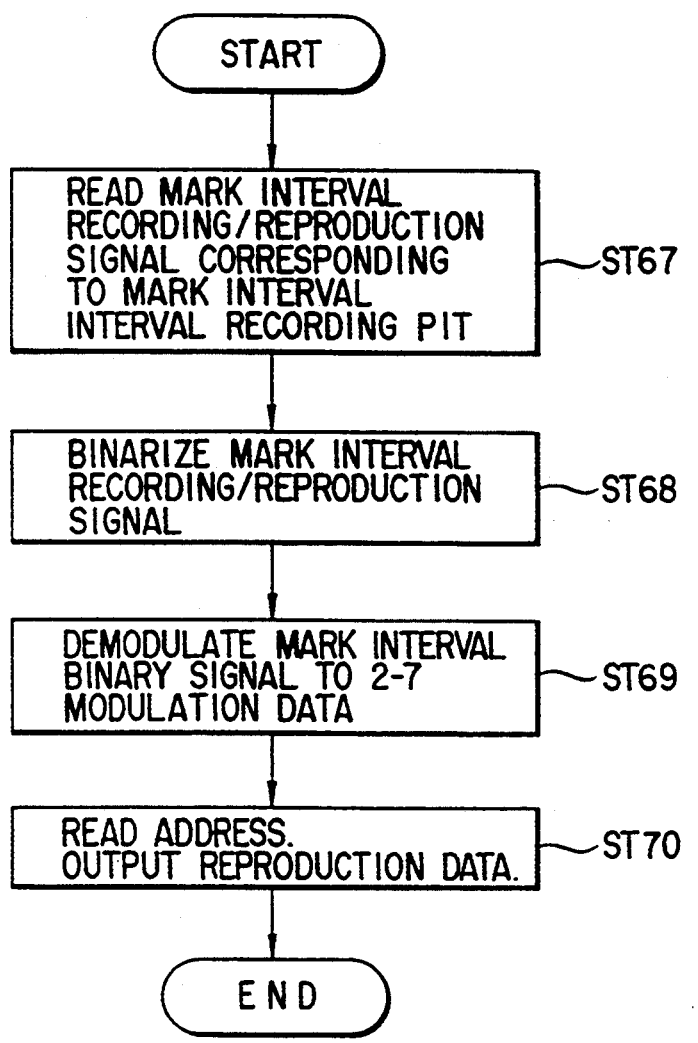

An operation of recording/reproducing information performed when the control circuit 6 discriminates that the optical disk 1a of the mark interval recording scheme is mounted will be described with reference to the flow charts of FIGS. 7A and 7B.

That is, during recording, digital data (recording data) is supplied from the host computer through the interface circuit 43, and is supplied to the error correction circuit 41 through the buffer memory 44 (ST61). The error correction circuit 41 adds a correction code to the supplied recording data, and outputs the new recording data to the modulation circuit 51 (ST62). The modulation circuit 51 modulates the supplied recording data to the 2–7 modulation data, as shown in FIG. 4B, and outputs it to the mark interval recording waveform equalizer 53 (ST63).

The mark interval recording waveform equalizer 53 converts the supplied mark interval data to a signal having a mark interval recording waveform, as shown in FIG. 4D (ST64). The signal having this mark interval recording waveform is supplied to the laser driver 20 through the switching circuit 55.

The laser driver 20 modulates the drive current of the semiconductor laser oscillator 8 in accordance with the supplied signal having the mark interval recording waveform (ST65). Then, a laser beam corresponding to the mark interval recording waveform is radiated on the optical disk 1a through the collimator lens 9, the beam splitter 10, and the objective lens 11, and a mark interval recording pit, as shown in FIG. 4F, is formed on the optical disk 1a (ST66).

During reproduction, the mark interval recording scheme pit (FIG. 4F) formed on the optical disk 1a is subjected to photoelectric conversion by the photodetector 15 in the optical head 7 and amplified by the signal amplifier 22, and a mark interval recording/reproduction signal, as shown in FIG. 4H, is output (ST67). This mark interval recording/reproduction signal is binarized by the mark interval binarization circuit 24 to be a mark interval binary signal, as shown in FIG. 4J (ST68).

An output from the mark interval binarization circuit 24 is supplied to the demodulation circuit 28 through the switching circuit 27. The demodulation circuit 28 demodulates the supplied mark interval binary signal in accordance with inverse 2–7 code conversion, and outputs it to the error correction circuit 41 and the address decoder circuit 42 (ST69).

The address decoder circuit 42 performs address reading. The read result is output to the control circuit 6. Simultaneously, the demodulated data is corrected by the error correction circuit 41 and output as the reproduction data to the host computer through the buffer memory 44 and the interface circuit 43 (ST70).

In this embodiment, the scheme of recording data on the optical disk is discriminated from the control a data read from the optical disk. Instead, the recording scheme may be discriminated in accordance with whether the reflectivity measured of the mirror portion of the optical disk is higher or lower than the reference reflectivity. Sill alternatively, the recording scheme, either mark-interval recording scheme or mark-length recording scheme, may be discriminated in accordance of the number of headers, per track, provided on the disk 1a or 1b.

When the mark length recording scheme is employed, the recording density theoretically becomes twice that of the case when the mark interval recording scheme is employed. Accordingly, as shown in FIGS. 2A and 2B, the mark length recording scheme has a larger number of headers than that of the mark interval recording scheme.

Figure 8:
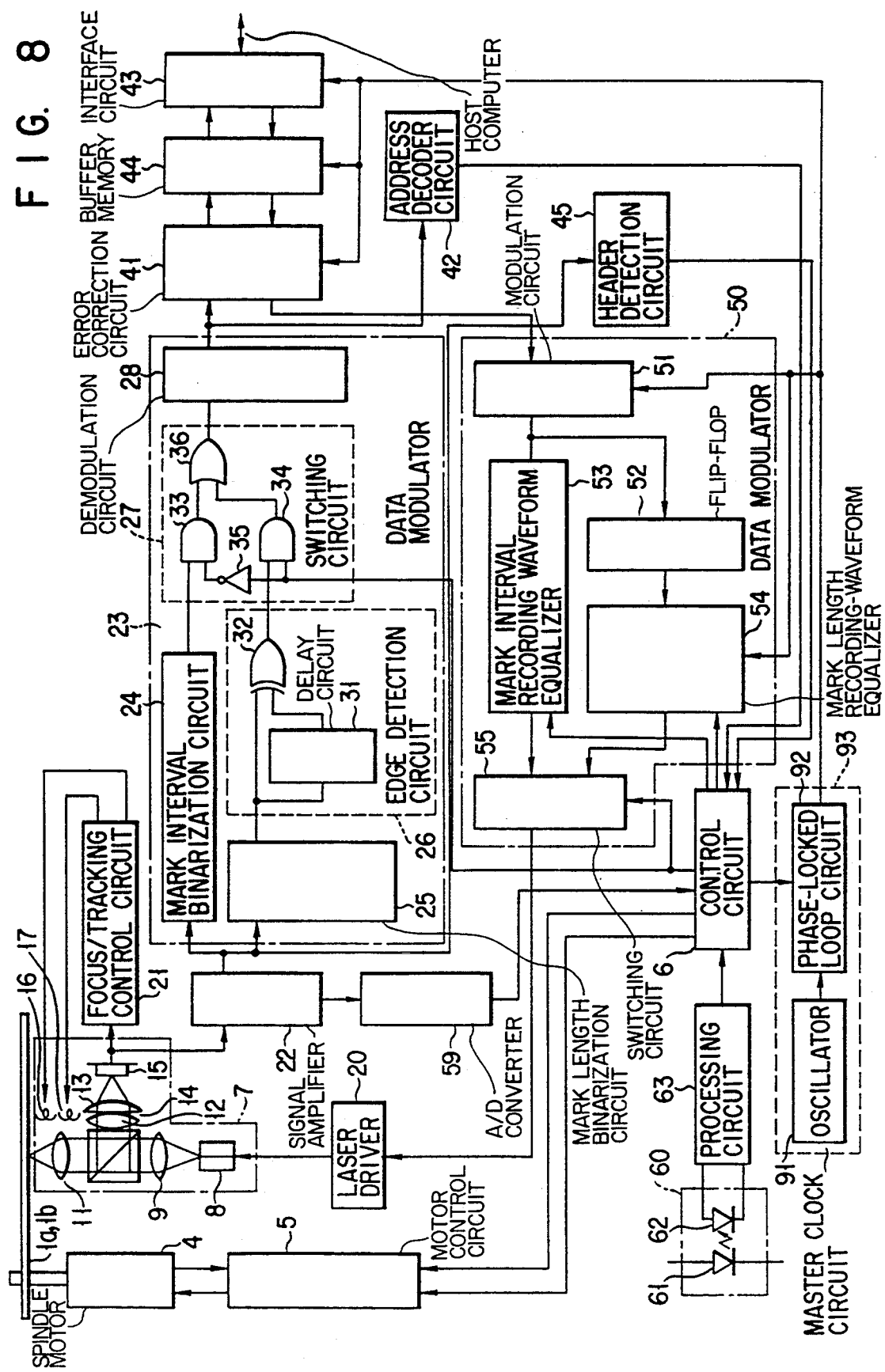
FIG. 8 is a block diagram showing the arrangement of an optical disk apparatus according to another embodiment of the present invention.

This embodiment can be realized by adding a header detection circuit 45, as shown in FIG. 8.

More specifically, as shown in FIG. 8, the header detection circuit 45 detects the headers from the signal output from the signal amplifier 22, and comprises, e.g., an envelope detector and a binarization circuit (neither are shown). Thus, a pulse signal corresponding to a header is output to the control circuit 6.

The control circuit 6 counts the number of headers per track by counting the pulse signals corresponding to one track and sent from the header detection circuit 45, and discriminates whether the mark interval or mark length recording scheme is employed in accordance with the count. For example, when the number of headers per track is 15, the control circuit 6 determines that the mark interval recording scheme is employed; when the number of headers per track is 30, the control circuit 6 determines that the mark length recording scheme is employed.

More specifically, the recording scheme can be discriminated by performing counting by the control circuit 6 through the header detection circuit 45. In this case, since the header detection circuit 45 need only detect a header portion as a block of information, whether the switching circuit 27 selects the mark interval recording/reproduction signal from the mark interval binarization circuit 24 or the edge detection signal sent from the edge detection circuit 26 poses no problem.

When the headers are to be detected by the header detection circuit 45, in order to detect a correct number of headers, the headers are detected at a specific position (the same radial position) of the track as a target of discrimination of the optical disk 1a or 1b where only headers are formed and no data information is recorded.

As described above, at least two means for discriminating a plurality of recording schemes are employed, and when their discrimination results coincide, the recording scheme is determined.

An embodiment wherein the recording capacity per track is gradually increased toward outer tracks even with the both recording schemes will be described.

As shown in FIG. 8, a master clock circuit 93 comprising an oscillator 91 for generating a signal having a predetermined frequency and a phase-locked loop (PLL) circuit 92 for frequency-dividing the signal from the oscillator 91 at a frequency division ratio set by the control circuit 6 is provided. The respective circuits of the recording and reproduction systems are operated by an output from the master clock circuit 93.

When the clock frequency of the master clock circuit 93 is gradually increased toward the outer periphery of the optical disk 1a or 1b, the recording capacity per track can be increased regardless of the recording scheme. More specifically, in either recording scheme, recording and reproduction (recording and reproduction by an MCAV) at a predetermined line density can be performed while the optical disk 1a or 1b is rotated at a predetermined corresponding rotational speed.

As has been described above, the present invention provides an information recording/reproducing apparatus, having the spindle motor 4 for rotating the circular optical disk 1a or 1b, for recording/reproducing information on/from the optical disk 1a or 1b rotated by the spindle motor 4, wherein when two discrimination results as to whether the recording scheme of the optical disk is the mark interval or mark length recording scheme coincide, the coincident result is determined as the correct recording scheme, and information can be recorded/reproduced while selection of signal processing circuits, control of the motor rotational speed, and selection of the level of laser beam corresponding to the discriminated recording scheme are performed.

Hence, in an apparatus for recording/reproducing information in accordance with both the mark interval and mark length recording schemes, whether the recording scheme is the mark length or mark interval recording scheme can be reliably discriminated.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for reproducing information from a first type recording medium and a second type recording medium, said information being defined on said first type recording medium using lengths of pits and spaces formed thereon, said information being defined on said second type recording medium using pit-to-pit intervals formed thereon, a type of each respective first type recording medium and said second type recording medium being represented by data stored thereon, cartridges having an identifying portion being used to house each of said first type recording medium and said second type recording medium respectively, said apparatus comprising:

supporting means for supporting supported recording medium, said supported recording medium including said first type recording medium and said second type recording medium;

means for classifying a type of said supported recording medium based on said identifying portion of a corresponding one of said cartridges;

first reproducing means for reproducing said stored data from said supported recording medium using a first process when said supported recording medium is classified by said classifying means as said first type recording medium, said first process corresponding to said first type recording medium;

second reproducing means for reproducing said stored data from said supported recording medium using a second process when said supported recording medium is classified by said classifying means as said second type recording medium, said second process corresponding to said second type recording medium; and means for determining that said supported recording medium is said first type recording medium when said stored data is able to be reproduced using said first reproducing means, and for determining that said supported recording medium is said second type recording medium when said stored data is able to be reproduced from said supported recording medium using said second reproducing means.

2. An apparatus according to claim 1, wherein said first reproducing means reproduces information defined by the lengths of the pits and the spaces between the pits, and said second reproducing means reproduces information defined by the pit-to-pit intervals.

3. An apparatus according to claim 1, wherein said first type recording medium and said second type recording medium each have a control data area, said control data area storing said data representing the type of said recording medium.

4. An apparatus according to claim 1, wherein said first type recording medium and said second type recording medium each have a header portion storing an address as said stored data.

5. An apparatus according to claim 1, wherein said first reproducing means comprises:

a mark-length binarization circuit for binarizing an input signal using a center level of said input signal as a reference level to produce a first binary signal, an edge detecting circuit for detecting edges of said first binary signal to produce edge signals, and a demodulating circuit for demodulating said edge signals; and wherein, said second reproducing means comprises:

a mark-interval binarization circuit for binarizing a peak of said input signal to produce a second binary signal, and a demodulating circuit for demodulating said second binary signal.

6. An apparatus according to claim 1, further comprising means for detecting an error when said second reproducing means is unable to reproduce said stored data from said supported recording medium.

7. An apparatus for reproducing information from a first type recording medium and a second type recording medium, said information being defined on said first type recording medium using lengths of pits and spaces formed thereon, said information being defined on said second type recording medium using pit-to-pit intervals formed thereon, cartridges having an identifying portion being used to house each of said first type recording medium and said second type recording medium respectively, a type of said recording medium being represented by data stored on said first type recording medium and said second type recording medium, said apparatus comprising:

supporting means for supporting supported recording medium, said supported recording medium including said first type recording medium and said second type recording medium;

means for classifying said supported recording medium based on said identifying portion of a corresponding one of said cartridges;

first reproducing means for reproducing said stored data from said supported recording medium using a first process when said supported recording medium is classified by said classifying means as said first type recording medium, said first process corresponding to said first type recording medium;

second reproducing means for reproducing said stored data from said supported recording medium using a second process when said first reproducing means is not able to reproduce said stored data from said supported recording medium, said second process corresponding to said second type recording medium; and means for determining that said supported recording medium is said first type recording medium when said data stored on said supported recording medium is able to be reproduced using said first reproducing means, and for determining that said supported recording medium is said second type recording medium when said data stored on said supported recording medium is able to be reproduced using said second reproducing means.

8. An apparatus according to claim 7, wherein said second reproducing means also reproduces said stored data from said supported recording medium using said second process when said supported recording medium is classified by said classifying means as said second type recording medium.

9. An apparatus according to claim 7, wherein said first reproducing means reproduces information defined by said lengths of said pits and said spaces between said pits using said first process, and said second reproducing means reproduces information defined by said pit-to-pit intervals using said second process.

10. An apparatus according to claim 7, wherein each of said first type recording medium and said second type recording medium has a control data area, said control data area storing said data representing said type of said supported recording medium.

11. An apparatus according to claim 7, wherein each of said first type recording medium and said second type recording medium has a header portion on which an address is stored, said stored data including said address.

12. An apparatus according to claim 7, wherein, said first reproducing means comprises:

a mark-length binarization circuit for binarizing an input signal using a center level of said input signal as a reference level to produce a first binary signal, an edge detecting circuit for detecting edges of said first binary signal to produce edge signals, and a demodulating circuit for demodulating said edge signals; and wherein, said second reproducing means comprises:
- a mark-interval binarization circuit for binarizing a peak of said input signal to produce a second binary signal, and
- a demodulating circuit for demodulating said second binary signal.

13. An apparatus according to claim 7, further comprising means for detecting an error when said second reproducing means is unable to reproduce said stored data from said supported recording medium.

14. An apparatus for reproducing information from a first type recording medium and a second type recording medium, said first type recording medium storing information which is reproduced in a first reproducing method, said second type recording medium storing information which is reproduced in a second reproducing method, a type of each respective first type recording medium and said second type recording medium being represented by data stored thereon, cartridges having an identifying portion being used to house each of said first type recording medium and said second type recording medium respectively, said apparatus comprising:
- supporting means for supporting supported recording medium, said supporting recording medium including said first type recording medium and said second type recording medium;
- means for classifying a type of said supported recording medium based on said identifying portion of a corresponding one of said cartridges;
- first reproducing means for reproducing said stored data from said supported recording medium using a first process when said supported recording medium is classified by said classifying means as said first type recording medium, said first process corresponding to said first type recording medium;
- second reproducing means for reproducing said stored data from said supported recording medium using a second process when said first reproducing means is not able to reproduce said stored data from said supported recording medium, said second process corresponding to said second type recording medium; and
- means for determining that said supported recording medium is said first type recording medium when said stored data is able to be reproduced using said first reproducing means, and for determining that said supported recording medium is said second type recording medium when said stored data is able to be reproduced from said supported recording medium using said second reproducing means.

15. An apparatus according to claim 14, wherein said second reproducing means also reproduces said stored data from said supported recording medium using said second process when said supported recording medium is classified by said classifying means as said second type recording medium.

16. An apparatus according to claim 14, wherein said first type recording medium and said second type recording medium each have a control data area, said control data area storing said data representing the type of said recording medium.

17. An apparatus according to claim 14, wherein said first type recording medium and said second type recording medium each have a header portion storing an address as said stored data.

18. An apparatus according to claim 14, further comprising means for detecting an error when said second reproducing means is unable to reproduce said stored data from said supported recording medium.

19. An apparatus for reproducing information from a first type recording medium and a second type recording medium, said first type recording medium storing information which is reproduced using a first reproducing method, said second type recording medium storing information which is reproduced using a second reproducing method, a type of each respective first type recording medium and said second type recording medium being represented by data stored thereon, cartridges having an identifying portion being used to house each of said first type recording medium and said second type recording medium respectively, said apparatus comprising:
- supporting means for supporting supported recording medium, said supported recording medium including said first type recording medium and said second type recording medium;
- means for classifying a type of said supported recording medium based on said identifying portion of a corresponding one of said cartridges;
- first reproducing means for reproducing said stored data from said supported recording medium using a first process when said supported recording medium is classified by said classifying means as said first type recording medium, said first process corresponding to said first type recording medium;
- second reproducing means for reproducing said stored data from said supported recording medium using a second process when said supported recording medium is classified by said classifying means as said second type recording medium, said second process corresponding to said second type recording medium; and
- means for determining that said supported recording medium is said first type recording medium when said stored data is able to be reproduced using said first reproducing means, and for determining that said supported recording medium is said second type recording medium when said stored data is able to be reproduced from said supported recording medium using said second reproducing means.

20. An apparatus according to claim 19, wherein said first type recording medium and said second type recording medium each have a control data area, said control data area storing said data representing the type of said recording medium.

21. An apparatus according to claim 19, wherein said first type recording medium and said second type recording medium each have a header portion storing an address as said stored data.

22. An apparatus according to claim 19, further comprising means for detecting an error when said second reproducing means is unable to reproduce said stored data from said supported recording medium.

23. An apparatus for reproducing information from a first type recording medium and a second type recording medium, said information being defined on said first type recording medium using lengths of pits and spaces formed thereon, said information being defined on said second type recording medium using pit-to-pit intervals formed thereon, a type of each respective first type recording medium and said second type recording medium being represented by data stored thereon, cartridges having an identifying portion being used to house each of said first type recording medium and said second type recording medium respectively, said apparatus comprising:
- supporting means for supporting supported recording medium, said supported recording medium including said first type recording medium and said second type recording medium;
- means for classifying a type of said supported recording medium based on said identifying portion of a corresponding one of said cartridges;
- first reproducing means for reproducing said stored data from said supported recording medium using a first process when said supported recording medium is classified by said classifying means as said first type recording medium, said first process corresponding to said first type recording medium;
- second reproducing means for reproducing said stored data from said supported recording medium using a second process when said supported recording medium is classified by said classifying means as said second type recording medium, said second process corresponding to said second type recording medium;
- means for determining that said supported recording medium is said first type recording medium when said stored data is able to be reproduced using said first reproducing means, and for determining that said supported recording medium is said second type recording medium when said stored data is able to be reproduced from said supported recording medium using said second reproducing means;
- first detecting means for detecting said lengths of said pits and said spaces between said pits formed on said supported recording medium when said supported recording medium is determined to be said first type recording medium;
- second detecting means for detecting positions of said pits formed on said supported recording medium when said supported recording medium is determined to be said second type recording medium;
- first means for reproducing information from said supported recording medium based on a detection result produced from said first detecting means; and second means for reproducing information from said supported recording medium based on a detection result produced from said second detecting means.

24. An apparatus according to claim 23, wherein said first type recording medium and said second type recording medium each have a control data area, said control data area storing said data representing the type of said recording medium.

25. An apparatus according to claim 23, wherein said first type recording medium and said second type recording medium each have a header portion storing an address as said stored data.

26. An apparatus according to claim 23, wherein said first reproducing means comprises:
- a mark-length binarization circuit for binarizing an input signal using a center level of said input signal as a reference level to produce a first binary signal,
- an edge detecting circuit for detecting edges of said first binary signal to produce edge signals, and
- a demodulating circuit for demodulating said edge signals; and wherein, said second reproducing means comprises:
- a mark-interval binarization circuit for binarizing a peak of said input signal to produce a second binary signal, and
- a demodulating circuit for demodulating said second binary signal.

27. An apparatus according to claim 23, further comprising means for detecting an error when said second reproducing means is unable to reproduce said stored data from said supported recording medium.

* * * * *